(12) United States Patent
Tiwari et al.

(10) Patent No.: US 11,588,744 B1
(45) Date of Patent: *Feb. 21, 2023

(54) AUTOMATIC SCALING OF RESOURCES FOR MESSAGE PROCESSING

(71) Applicant: Amazon Technologies, Inc., Seattle, WA (US)

(72) Inventors: Srijan Tiwari, Bengaluru (IN); Manoj Tharwani, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,477

(22) Filed: Sep. 10, 2021

Related U.S. Application Data

(63) Continuation of application No. 15/838,075, filed on Dec. 11, 2017, now Pat. No. 11,134,019.

(51) Int. Cl.
*H04L 47/30* (2022.01)
*H04L 47/70* (2022.01)

(52) U.S. Cl.
CPC .............. *H04L 47/30* (2013.01); *H04L 47/82* (2013.01)

(58) Field of Classification Search
CPC .................................. H04L 47/30; H04L 47/82
See application file for complete search history.

(56) References Cited

U.S. PATENT DOCUMENTS

| | | | |
|---|---|---|---|
| 9,146,764 B1 | 9/2015 | Wagner | |
| 11,295,229 B1* | 4/2022 | Kumar | G06N 20/00 |
| 2006/0129691 A1 | 6/2006 | Coffee | |
| 2011/0286037 A1* | 11/2011 | Hamada | G06F 9/5027 358/1.15 |
| 2012/0198004 A1 | 8/2012 | Watte | |
| 2015/0088999 A1 | 3/2015 | Carr | |
| 2016/0226718 A1* | 8/2016 | Hamburger | G06F 15/167 |
| 2016/0352649 A1 | 12/2016 | Lin | |
| 2017/0134330 A1 | 5/2017 | Clark | |
| 2017/0235808 A1* | 8/2017 | Salame | H04L 67/565 707/625 |
| 2017/0244782 A1* | 8/2017 | Brooks | H04L 47/12 |
| 2018/0091394 A1* | 3/2018 | Richards | H04L 47/82 |

* cited by examiner

*Primary Examiner* — Sm A Rahman

(74) *Attorney, Agent, or Firm* — Knobbe, Martens, Olson & Bear, LLP

(57) ABSTRACT

A triggering system of a message processing service invokes a dispatch function to execute code to determine a set of message consumption functions to launch in order to process a set of messages from a queue. The dispatch function determines, based at least in part on the number of messages in the queue, the number of message consumption functions of the set that are to process these messages. The dispatch function invokes, based on the determination, the set of message consumption functions to process the set of messages from the queue.

20 Claims, 7 Drawing Sheets

AUTOMATIC SCALING OF RESOURCES FOR MESSAGE PROCESSING

CROSS-REFERENCE TO RELATED APPLICATION

This application is continuation of U.S. patent application Ser. No. 15/838,075, filed Dec. 11, 2017, entitled "AUTOMATIC SCALING OF RESOURCES FOR MESSAGE PROCESSING," the content of which is incorporated by reference herein in its entirety.

BACKGROUND

Computing resource service providers and other service providers often invoke a variety of resources for the performance and processing of messages provided by customers of these service providers. In the event that network traffic increases beyond the capacity of the set of resources implemented by a service provider, the service provider provisions additional resources to increase the capability of the service provider to process the increased network traffic and, hence, messages. However, if the network traffic decreases, it can be difficult to determine when to reduce the number of resources as it can be difficult to predict when another increase in network traffic will occur. This can lead to additional expense to service providers and their customers, as there us an additional cost to maintaining these additional resources during a lull in network traffic and the processing of messages.

BRIEF DESCRIPTION OF THE DRAWINGS

Various techniques will be described with reference to the drawings, in which.

DETAILED DESCRIPTION

Figure 1:
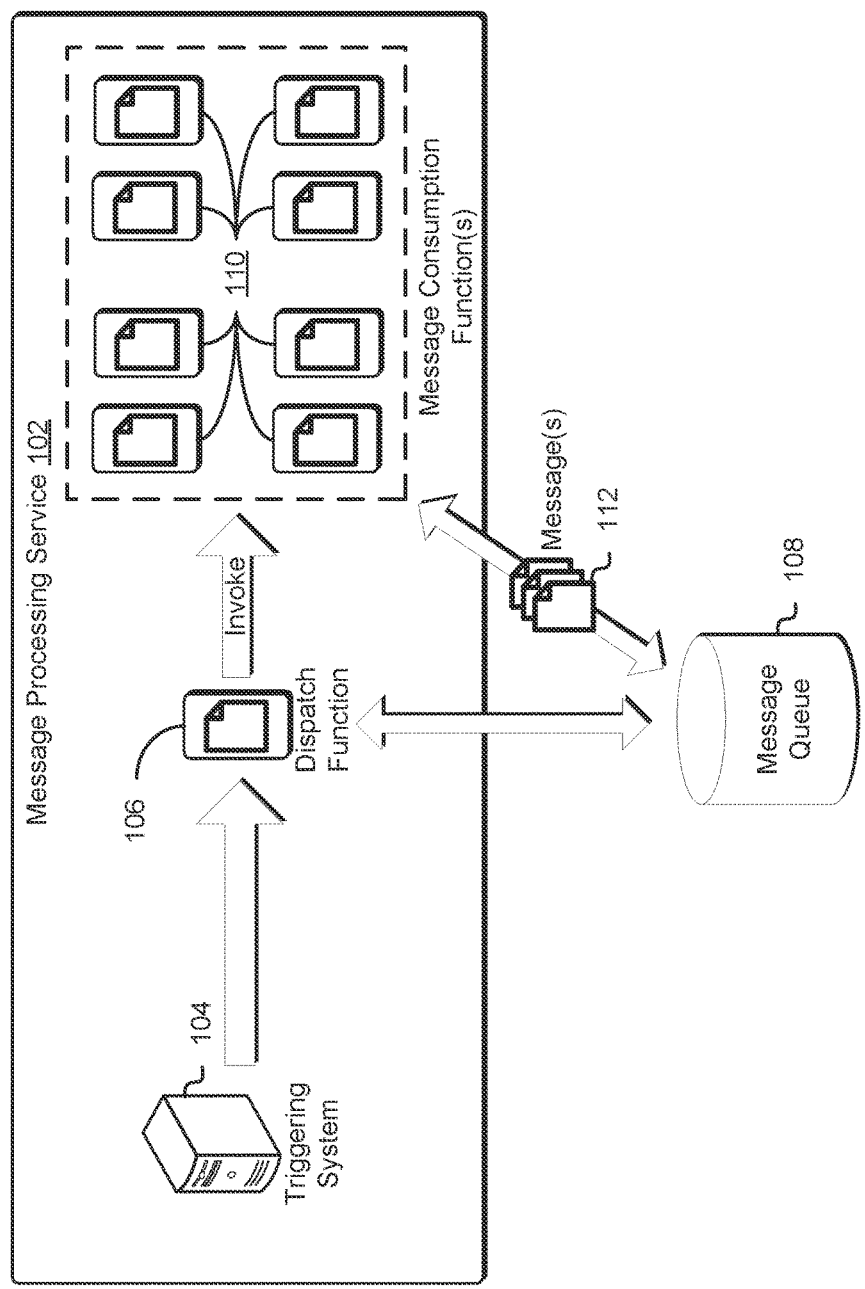
FIG. 1 shows an illustrative example of a system in which various embodiments can be implemented.

This disclosure relates to methods and techniques for scaling resources according to the identified rate of network traffic and messages that are to be processed by these resources. In an embodiment, a triggering system of a message processing service invokes a dispatch function that is to query a message queue to identify the number of messages present in the message queue that are to be processed by the message processing system and, based at least in part on the number of messages identified, determine a set of message consumption functions that can be invoked to process these messages. In an embodiment, the triggering system comprises one or more computer systems of the message processing service, an application or process installed on a computer system of the message processing service, or other resource that invokes dispatch functions at particular time intervals or in response to a triggering event (e.g., indication of an increase in the volume of messages being received, etc.). In an embodiment, the dispatch function is a virtual computer system instance or other computing resource capable of processing executable code, such as a software container including executable code operating on a computing resource designated as a container instance to execute code for determining a set of message consumption functions for the processing of messages in a message queue.

In an embodiment, the dispatch function identifies the time required by a message consumption function to process a message from the message queue. In an embodiment, this information is stored in a repository of the message processing service, which the dispatch function accesses to identify the time required by a message consumption function to process a message. In an embodiment, if this information has not been previously determined, the message consumption function invokes a message consumption function and transmits executable instructions to the message consumption function to process a message from the message queue. In an embodiment, the message consumption function is a virtual computer system instance or other computing resource capable of processing messages from the message queue and providing a result. In an embodiment, the message consumption function is a software container including executable code operating on a computing resource designated as a container instance to obtain messages from a message queue and process these messages. In an embodiment, the dispatch function monitors the message consumption function to determine the rate at which the message consumption function processes a message from the message queue. Using this rate and the timespan duration of the message consumption function, the dispatch function determines the number of messages that a message consumption function can process during its timespan duration. In an embodiment, the dispatch function identifies the number of messages available in the message queue and, based at least in part on the number of messages available and the information obtained from evaluation of a message consumption function, the dispatch function determines a number of message consumption functions to be invoked to process the available messages.

In an embodiment, the triggering system invokes a second dispatch function during the timespan duration of the first dispatch function, resulting in an overlap between different dispatch functions. In an embodiment, the triggering system divides the timespan duration of a dispatch function by an overlap parameter, where the overlap parameter is a value greater than one, to identify a time at which the triggering system is to invoke another dispatch function. This overlap parameter, in an embodiment, is determined based at least in part on data related to the variability of the network traffic resulting in the number of messages present in the message queue at a given time. In an embodiment, if network traffic is highly variable (e.g., subject to significant spikes and lulls), the timespan duration of a message consumption function is increased. In an embodiment, if the initiation of a message consumption function is made more difficult (e.g., upload of code to execute operations for processing of messages, etc.), the timespan duration of a message consumption function is increased. This can result in reduced sensitivity to changes in network traffic over time. In an embodiment, to increase this sensitivity, the triggering system defines a high value for the overlap parameter. Thus, in an embodiment, if network traffic is highly variable, the triggering system defines a higher value for the overlap function. Similarly, in an embodiment, the value of the overlap parameter is set to a high value if invocation of the dispatch function and the message consumption functions is costly or there is lag in the invocation of these functions. In an embodiment, the triggering system utilizes the timespan duration of the dispatch function and the overlap parameter to determine a gap between invocations of dispatch functions for the subsequent invocations of message consumption functions. By overlapping invocations of dispatch functions and because of the periodic nature of the triggering system, message consumption functions are continuously being invoked to process messages from the message queue, regardless of the amount of network traffic. In an embodiment, as network traffic varies, the number of message consumption functions can also vary. In an embodiment, if there is no overlap parameter applied, the timespan duration of the dispatch function and the message consumption functions are identical.

In this manner, a message processing system can utilize dispatch functions to invoke message consumption functions to process messages from a message queue in a matter that is based at least in part on variations in network traffic over time. In an embodiment, if the network traffic increases or decreases, a dispatch function invokes message consumption functions at a rate that is commensurate to these increases or decreases in network traffic. Hence, the message processing system scales up or down the number of message consumption functions invoked for processing of these messages with changing network traffic in a short period of time. Additionally, the techniques described and suggested herein facilitate additional technical advantages. For example, because an overlap parameter is introduced to cause an overlap between invocations of dispatch functions, additional efficiencies are introduced to the message processing service. In an embodiment, in the event of a lull in network traffic, resulting in message consumption functions processing messages prior to their timespan duration, the next set of message consumption functions invoked by another dispatch function can obtain new messages as they are added to the message queue. Further, in an embodiment, if there is a drastic increase in network traffic after a dispatch function has invoked a set of message consumption functions, the next set of message consumption functions invoked by another dispatch function will contribute to consumption of messages from the message queue as the previously invoked set of message consumption functions expire. In an embodiment, the other dispatch function invokes a greater number of message consumption functions based at least in part on the increase in network traffic. This enables the first set of message consumption functions to work with the second set of message consumption functions invoked by the other dispatch function to consume messages added to the message queue at a greater rate, while minimizing the lag in processing of these additional messages.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a message processing service 102 initiates a triggering system 104 to invoke a dispatch function 106 for the processing of a set of messages 112 in a message queue 108. In an embodiment, the message processing service 102 comprises one or more computer systems that monitor network traffic to identify messages that are to be performed. In an embodiment, the message processing service 102 is a computer system or an application installed on a computing system of a computing resource monitoring service, which partitions measurements and data from various customer computer systems into various logical partitions and delivers measurements from each logical partition to aggregator systems for the aggregation of these measurements. The messages 112 in the message queue 108, in an embodiment, include executable code that if executed results in the partitioning and aggregation of these measurements. In an embodiment, the messages 112 specify actions to be performed on behalf of a customer of the message processing service 102, such as the aforementioned partitioning and aggregation of data, deletion of data from a datastore, storage of data in a datastore, and the like. It should be noted that while messages are used extensively throughout the present disclosure for the purpose of illustration, the techniques described herein can be applied to other items. These items can include tasks that are to be performed on behalf of customers of a service provider, performance metrics associated with resources provided by the service provider, data packets, and the like. Further, it should be noted that while message queues are used extensively throughout the present disclosure for the purpose of illustration, other data structures and methods of storing messages and other items can be used, such as data stacks, databases, lists, and the like.

In an embodiment, the triggering system 104 comprises one or more computer systems of the message processing service 102, an application or process installed on a computer system of the message processing service 102, or other resource that invokes dispatch functions at particular time intervals or in response to a triggering event (e.g., indication of an increase in the volume of messages 112 being received and added to the message queue 108, etc.). In an embodiment, the triggering system 104 invokes a dispatch function 106 to initiate a process for processing the messages 112 in the message queue 108. In an embodiment, the dispatch function 106 is any computing resource, such as a virtual computer system instance, that is configured to evaluate the message queue 108 to identify the number of messages 112 that are to be processed and, based at least in part on this number of messages 112, invoke a set of message consumption functions 110 for the processing of these messages 112. It should be noted that while the number of messages are used for the purpose of illustration, invocation of the set of message consumption functions 110 can be performed based at least in part on other measurements on the size of the message queue 108 (e.g., the aggregate size of messages in the message queue 108, the aggregate size of data linked to messages in the message queue 108, etc.).

In an embodiment, the dispatch function 106 is a container instance configured with a software container that includes code executable (e.g., by the resources associated with the container instance) to perform operations in accordance with techniques described herein. In an embodiment, a "container instance" refers to a computer system instance (virtual or non-virtual, such as a physical computer system running an operating system) that is configured to launch and run software containers. In an embodiment, dispatch function 106 is one of many different container instances registered to a cluster, and the other container instances of the cluster are configured to run the same or different types of containers. The container instances within the cluster can be of different instance types or of the same instance type, and the triggering system 104 can access more than one cluster. Thus, the triggering system 104, in an embodiment, can launch one or more clusters and then manage application isolation of the containers within each cluster. In an embodiment, the dispatch function 106 is a software container managed via a container instance of the message processing service 102 and accessible to the triggering system 104.

In an embodiment, the dispatch function 106 and the message consumption functions 110 are launched via application programming interface (API) calls to a container service that launches functions on demand using software containers. The container service, in an embodiment, is a service provided by a computing resource service provider to execute software containers within container instances. The software containers are launched to have only specified resources from resources allocated to the container instance; that is, a container is launched to have a certain amount of memory and to be guaranteed at least a specified amount of processing power. In an embodiment, multiple containers are run simultaneously on a single host computer or host container instance, and the resources of the host can be allocated efficiently between the software containers.

In an embodiment, the dispatch function 106 queries the message queue 108 to identify the number of messages 112 that are available for processing. In an embodiment, the dispatch function 106 determines the amount of time that it takes for a software container, such as a message consumption function 110, to process a message from the message queue 108. In an embodiment, to determine the amount of time that it takes for a message consumption function 110 to process a message from the message queue 108, the dispatch function 106 invokes a message consumption function 110 and monitors this message consumption function 110 as it processes messages from the message queue. Through the monitoring of the message consumption function 110, the dispatch function 106 identifies the amount of time that it takes for a message consumption function 110 to process a message. In an embodiment, this amount of time is supplied to the dispatch function 106 by the triggering system 104 in the executable code. In an embodiment, the dispatch function 106 identifies this amount of time from a reference datastore maintained by the message processing service 102.

In an embodiment, the dispatch function 106 determines the batch size of messages that can be obtained by a message consumption function 110 from the message queue 108 for processing. Using the batch size of the messages 112 that can be obtained from the message queue 108 and the amount of time it takes to process a single message from the message queue 108, the dispatch function 106 calculates a time period during with a message consumption function 110 is not to process additional messages from the message queue 108. In an embodiment, this time period ($N_{sp}$) is calculated using the equation:

$$N_{sp}=2*t*b \quad \text{[Eq. 1]}$$

where "t" is defined as the amount of time it takes for a message consumption function 110 to process a message from the message queue 108 and "b" is defined as the batch size of the messages 112 that a message consumption function 110 can obtain from the message queue 108. In an embodiment, this time period is calculated to create a buffer for each message consumption function 110 to prevent the incomplete processing of messages 112 at the end of the timespan duration of a message consumption function 110.

In an embodiment, the dispatch function 106 calculates, using the time period $N_{sp}$, the time required by a message consumption function 110 to process a message (e.g., "t") and the timespan duration of a message consumption function 110 (e.g., "X") to calculate the approximate number of messages 112 that can be consumed by a message consumption function 110 during its timespan duration. In an embodiment, this approximate number (e.g., "Y") is defined by the equation:

$$Y=(X-N_{sp})/t \quad \text{[Eq. 2]}$$

where the timespan duration of a message consumption function 110 is reduced by the time period $N_{sp}$, during which the message consumption function 110 is not to process additional messages. This value of Y, in an embodiment, is used to calculate the number of message consumption functions 110 that are to be invoked in order to process the messages 112 in the message queue 108. In an embodiment, this value is calculated by the dispatch function 106 using the following equation:

$$N=Z/Y \quad \text{[Eq. 3]}$$

where "Z" is defined as the number of messages 112 in the message queue 108 that are to be processed.

In an embodiment, if a message consumption function determines that there are no messages remaining in the message queue 108, the message consumption function terminates. Thus, while the timespan duration of a message consumption function is defined by the message processing service 102, a message consumption function can terminate prior to this timespan duration if there is a lull in network traffic or other event or set of events, resulting in fewer messages being added to the message queue 108 after the message consumption function has been invoked. In an embodiment, if message consumption functions terminate prior to their timespan duration due to the absence of messages in the message queue 108, the triggering system 104 reduces the timespan duration for message consumption functions 110 that are invoked at a later time. In an embodiment, if there is a reduction in the timespan duration of the message consumption functions 110, the dispatch function 106 utilizes this information, provided by the triggering system 104 or other component of the message processing service 102, in the equations described herein to determine the number of message consumption functions 110 that are to be invoked for the processing of messages 112 from the message queue 108. In an embodiment, while the dispatch function 106 is invoked with a particular timespan duration, once the dispatch function 106 has invoked the message consumption functions 110, the dispatch function 106 terminates.

In an embodiment, the dispatch function 106 incorporates an additional factor, a, that is used to increase the number of message consumption functions 110 that are to be invoked to process the messages 112 from the message queue 108. This factor, a, in an embodiment, is a value between 0 and 1 and denotes a safety factor usable to enable the processing of additional messages that are added to the message queue 108 after the message consumption functions 110 are invoked and before the next invocation of a dispatch function 106. This safety factor is applied to Eq. 3 described above, resulting in the following equation usable to identify the number of message consumption functions 110 to be invoked by the dispatch function 106.

$$N = Z/(\alpha * Y) \quad [\text{Eq. 4}]$$

The value of $\alpha$, in an embodiment, is defined by the message processing service 102 based at least in part on a rate at which messages 112 are added to the message queue 108 over a period of time. Thus, if there is an increase in the network traffic detected by the message processing service 102, the message processing service 102 sets the value for $\alpha$ closer to 0, resulting in a higher number of message consumption functions 110 being invoked by the dispatch function 106. Alternatively, if there is a decrease (e.g., lull) in the network traffic detected by the message processing service 102, the message processing service 102 sets the value for $\alpha$ closer to 1, resulting in a lower number of message consumption functions 110 being invoked. In an embodiment, the value for $\alpha$ is set by the message processing service 102 between invocations of dispatch functions by the triggering system 104.

In an embodiment, the dispatch function 106 invokes a number of message consumption functions 110 for the processing of messages 112 from the message queue 108, where the number is calculated using Eqs. 1-4 described above. In an embodiment, a message consumption function 110 is a compute instance that operates as a function according to a function definition defined by the dispatch function 106. Compute instances include software containers, virtual machine instances, and any other compute process that is time-bound (e.g., has a limited timespan duration) for performance of one or more operations. The message consumption functions 110 each access the message queue 108 to obtain a subset of the messages 112 for processing. In an embodiment, each message consumption function 110 submits a query to the message queue 108, which causes the message queue 108 to transmit a subset of the messages 112 to the message consumption function 110. As each message is processed, a message consumption function 110 provides the result of execution of the message to the message processing service 102 via a results repository or other data log.

In an embodiment, the dispatch function 106 is also time-bound in that it is subject to a limited timespan duration. In an embodiment, this limited timespan duration is equivalent to the timespan duration of each message consumption function 110. In an embodiment, the dispatch function 106 terminates once it has invoked the message consumption functions 110 for the processing of messages from the message queue 108. In an embodiment, the triggering system 104 invokes a new dispatch function 106 at the end of the timespan duration of the previous dispatch function. This new dispatch function 106 performs the same calculations performed by the previous dispatch function 106 in accordance with Eqs. 1-4. Thus, based at least in part on the number of messages 112 present in the message queue 108 and the value of a defined by the message processing service 102, this new dispatch function 106 can invoke a new set of message consumption functions 110 for processing of the messages 112 in the message queue 108. In an embodiment, since variations in network traffic can result in a greater or fewer number of messages added to the message queue 108, the new dispatch function 106 can invoke a greater or fewer number of message consumption functions 110 based at least in part on the calculations performed using Eqs. 1-4.

In an embodiment, the triggering system 104 invokes a new dispatch function during the timespan duration of another dispatch function, resulting in an overlap. In an embodiment, the message processing service 102 defines an overlap factor usable to determine a time during the timespan duration of a dispatch function 106 that the triggering system 104 is to invoke a new dispatch function for the invocation of additional message consumption functions 110. This overlap factor, in an embodiment, is determined based at least in part on the variability of network traffic. In an embodiment, the overlap factor is set to a higher value if network traffic is erratic (e.g., network traffic experiences significant peaks and lulls at irregular intervals, network traffic is unpredictable, etc.). In an embodiment, the overlap factor is set to a higher value if it is difficult or time-intensive to invoke a dispatch function 106. In an embodiment, the overlap factor is set to a higher value if the cost incurred in invoking the dispatch function 106 and the message consumption functions 110 is high or is expected to increase over time.

In an embodiment, the triggering system 104 uses the overlap factor and the timespan duration of a dispatch function to determine a time period between each dispatch function invocation. In an embodiment, this time period between each dispatch function is defined as $\Delta$, where $\Delta$ is defined by the equation:

$$\Delta = X/\ominus \quad [\text{Eq. 5}]$$

where X is the maximum timespan duration of a dispatch function and of each message consumption function and $\ominus$ is the overlap factor defined by the message processing system 102. In an embodiment, the overlap factor is defined using a value greater than one, such that for increasing values of $\ominus$, a new dispatch function is invoked earlier in the timespan duration of the previous dispatch function.

In an embodiment, if the message processing service 102 utilizes an overlap factor to cause the triggering system 104 to invoke dispatch functions at overlapping intervals, the dispatch functions are configured by the triggering system 104 to calculate a different number of message consumption functions 110 than that resulting from either Eqs. 3-4. In an embodiment, a dispatch function 106 that overlaps with another dispatch function is configured to calculate the number of message consumption functions 110 to be invoked in accordance with the following equation:

$$N = Z/(\mu * Y) \quad [\text{Eq. 6}]$$

where N is the number of message consumption functions 110 that are to be invoked, Z is the number of messages 112 in the message queue 108, Y is the number of messages that can be processed by a message consumption function during its timespan duration, and $\mu$ is a value between $1/\varnothing$ and $1/(\varnothing-1)$ to ensure that sufficient functions are launched. In an embodiment, the value of $\mu$ is selected to be near the left side of the range near $1/\varnothing$ to slightly overestimate the number of functions needed to ensure sufficient pulling from the queue. Thus, as the overlap factor increases, the value of $\mu$ decreases, resulting in a greater number of message consumption functions 110 being invoked by the dispatch function 106. In an embodiment, the value for $\mu$ is set by the message processing service 102, which can select the value of $\mu$ based at least in part on the efficiency of the message consumption functions 110 in processing messages 112 from the message queue 108 and the variability in network traffic.

In an embodiment, if the average timespan duration of the message consumption functions decreases (e.g., the message consumption functions terminate prior to their configured timespan durations due to an absence of messages in the message queue), the overlap factor enables for additional message consumption functions to be invoked. Thus, if additional messages are added to the message queue 108, these additional message consumption functions can process these additional messages. Further, due to application of the overlap factor, additional message consumption functions are invoked during the timespan duration of the previously invoked message consumption functions. This reduces the potential lag in processing messages from the message queue 108 that are added after invocation of the message consumption functions.

Figure 2:
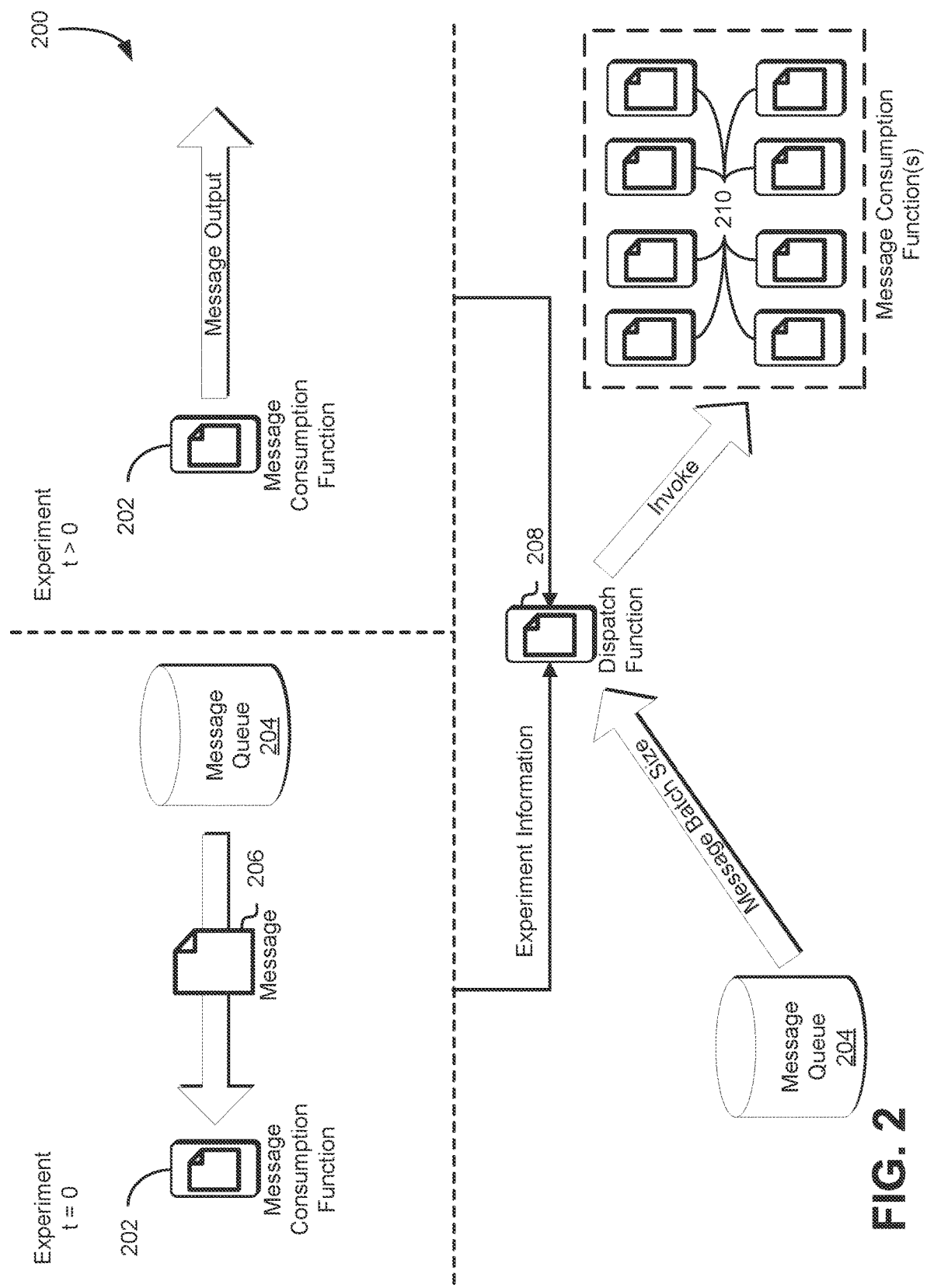
FIG. 2 shows an illustrative example of a system in which a message processing system determines a rate at which message consumption functions process messages from a message queue to determine a set of message consumption functions that are to be invoked by a dispatch function for the processing of messages in accordance with at least one embodiment.

FIG. 2 shows an illustrative example of a system 200 in which a message processing service determines a rate at which message consumption functions 210 process messages from a message queue 204 to determine a set of message consumption functions 210 that are to be invoked by a dispatch function 208 for the processing of messages in accordance with at least one embodiment. In the system 200, a dispatch function 208 is invoked by the message processing service to determine a set of message consumption functions 210 that are to be invoked in order to process a set of messages in the message queue 204. To determine the number of message consumption functions 210 that are to be invoked, the dispatch function 208, in an embodiment, invokes a first message consumption function 202 to process one or more messages 206 from the message queue 204. In an embodiment, the dispatch function 208 monitors the message consumption function 202 to identify the time required by the message consumption function 202 to process a message 206 from the message queue 204. In an embodiment, the time required by the message consumption function 202 to process a message 206 is stored in a datastore. Thus, dispatch functions invoked at a later can access the datastore and obtain this information without having to monitor a message consumption function to identify the time required to process a message.

In an embodiment, the dispatch function 208 queries the message queue 204 to determine the batch size of the messages that can be obtained by a message consumption function from the message queue 204 to be processed. Using the identified time required by the message consumption function 202 to process a message 206 and the batch size of the messages from the message queue 204 that can be processed by a message consumption function, the dispatch function 208 calculates a time period during with a message consumption function is not to process additional messages from the message queue 204. In an embodiment, this calculation is performed in accordance with Eq. 1, described above. In an embodiment, the dispatch function 208 uses the result of this calculation to identify the number of messages that can be processed by a message consumption function during its timespan duration, taking into account the time period during which the message consumption function is not to process additional messages from the message queue 204. In an embodiment, this second calculation is performed in accordance with Eq. 2, described above.

In an embodiment, the dispatch function 208 determines whether the message processing service has implemented the factor α to increase the number of message consumption functions 210 to be invoked by the dispatch function 208. As described above, the factor α is defined by the message processing service based at least in part on a rate at which messages are added to the message queue 204 over a period of time. Thus, if there is an increase in the network traffic detected by the message processing service, the message processing service sets the value for α closer to 0, resulting in a higher number of message consumption functions 210 being invoked by the dispatch function 208. Alternatively, if there is a decrease (e.g., lull) in the network traffic detected by the message processing service, the message processing service sets the value for α closer to 1, resulting in a lower number of message consumption functions 210 being invoked. In an embodiment, if the message processing service has not defined a value for the factor α, the dispatch function 208 calculates the number of message consumption functions 210 to be invoked in accordance with Eq. 3, described above. However, if the message processing service has defined a value for the factor α, the dispatch function 208 calculates the number of message consumption functions 210 to be invoked in accordance with Eq. 4.

In an embodiment, the dispatch function 208 is invoked during the timespan duration of another dispatch function due to an overlap factor being applied by the message processing service and implemented by the triggering system of the message processing service. In an embodiment, the dispatch function 208 obtains the overlap factor from the triggering system and identifies a scaling factor, μ, usable as input to calculate the number of message consumption functions 210 that are to be invoked to process the messages in the message queue 204. Thus, instead of using Eqs. 3-4 to calculate the number of message consumption functions 210 to invoke, the dispatch function 208, in an embodiment, calculates the number of message consumption functions 210 in accordance with Eq. 6, whereby an increase in the overlap factor results in a greater number of message consumption functions that are invoked to process the messages from the message queue 204.

Figure 3:
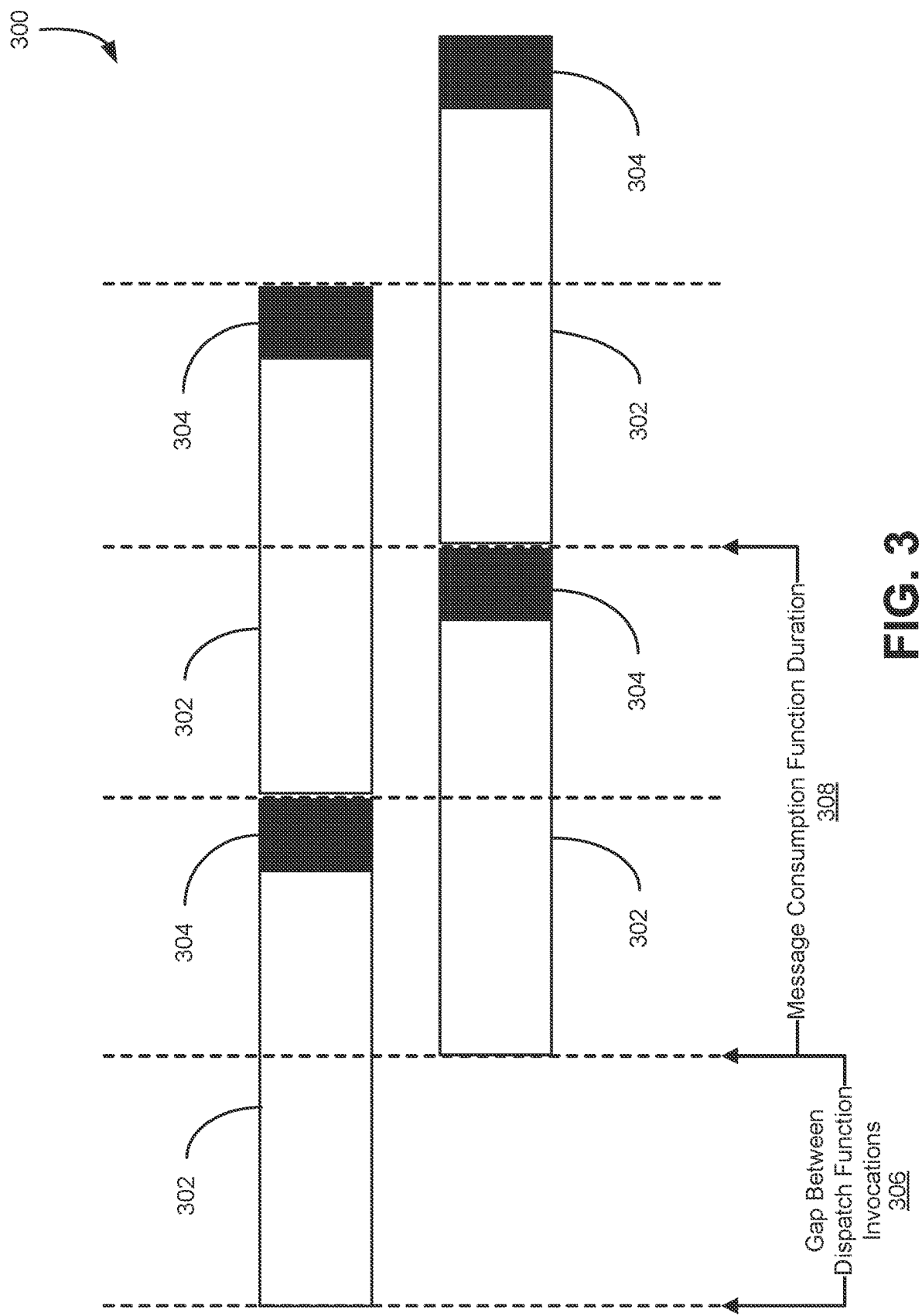
FIG. 3 shows an illustrative example of a system in which message consumption functions are invoked at overlapping intervals for the processing of messages from a message queue in accordance with at least one embodiment.

FIG. 3 shows an illustrative example of a system 300 in which message consumption functions are invoked at overlapping intervals for the processing of messages from a message queue in accordance with at least one embodiment. In the system 300, a dispatch function invokes at least one message consumption function for the processing of messages from a message queue. In an embodiment, the dispatch function is invoked during the timespan duration of another dispatch function, resulting in an overlap between the dispatch functions. This overlap, in an embodiment, is defined by the message processing service and is quantified using the overlap factor, Ø, described above.

In an embodiment, a triggering system of the message processing service invokes a first dispatch function, which has a timespan duration equivalent to the message consumption function duration 308. The message consumption function duration 308 is the timespan duration of a message consumption function 302 that is invoked to process a set of messages from the message queue. It should be noted that while FIG. 3 illustrates that the timespan duration of the dispatch function and of each message consumption function are the same, these timespan durations can be different, whereby a dispatch function can have a timespan duration that is shorter or longer than the message consumption function duration 308. In an embodiment, while the dispatch function has a particular timespan duration, the dispatch function terminates once the message consumption functions are invoked. This termination can occur prior to the end of the timespan duration of the dispatch function.

In an embodiment, the first dispatch function obtains the overlap factor and determines a scaling factor, μ, usable to identify the number of message consumption functions that are to be invoked to process messages from the message queue. In an embodiment, the first dispatch function calculates the number of message consumption functions to be invoked using Eq. 6, as described above. The first dispatch function invokes the calculated number of message consumption functions and enables these message consumption functions to process messages from the message queue. Thus, during the message consumption function duration 308 for the invoked message consumption functions, each message consumption function 302 processes messages from the message queue.

In an embodiment, each message consumption function 302 has a defined subset of its message consumption function duration 308 during which no messages can be processed by the message consumption function 302. This subset of the message consumption function duration 308 is defined in accordance with Eq. 1 described above. In an embodiment, the first dispatch function determines, based at least in part on experimental data obtained through invocation of a single message consumption function, the time required for the message consumption function to process a message from the message queue. In an embodiment, the first dispatch function queries the message queue to determine the batch size of the messages that can be obtained by a message consumption function for processing. Using this information and Eq. 1, the first dispatch function calculates the time period 304 during which a message consumption function 302 is not to process additional messages from the message queue.

In an embodiment, the first dispatch function uses the time period 304, the message consumption function duration 308, and the time required by a message consumption function to process a message from the message queue to determine the number of messages that can be processed by a message consumption function during the message consumption function duration 308. In an embodiment, this determination is made in accordance with Eq. 2, described above. The first dispatch function, in an embodiment, uses the number of messages that can be processed by a message consumption function, the number of messages in the message queue that are to be processed, and the scaling factor, μ, to determine the number of message consumption functions that are to be invoked in order to process the messages in the message queue. In an embodiment, this determination is made in accordance with Eq. 6, described above. The scaling factor, in an embodiment, is provided to the first dispatch function by the triggering system or by the message processing service.

In an embodiment, the first dispatch function invokes a set of message consumption functions in accordance with the value calculated using Eq. 6. As each message consumption function processes a message, message results are stored in a repository for use by the message processing service. This can include providing the results to customers of a service provider or using the results for other purposes. In an embodiment, the triggering system determines the gap 306 between dispatch function invocations to determine when to invoke the next dispatch function. In an embodiment, the gap 306 is determined based at least in part on the overlap factor, Ø, defined by the message processing service. In an embodiment, the gap 306 is calculated by the triggering system in accordance with Eq. 5, described above.

In an embodiment, the triggering system monitors the first dispatch function to determine whether a time period equal to the gap 306 has elapsed since invocation of the first dispatch function. If this time period has elapsed, the triggering system invokes the next dispatch function. In an embodiment, if the next dispatch function has the same timespan duration of the first dispatch function, the timespan durations of the dispatch functions will overlap. In an embodiment, the next dispatch function performs the calculations previously performed by the first dispatch function to determine the number of new message consumption functions that are to be invoked to process the messages present in the message queue. These messages may differ from those processed by the previous set of message consumption functions invoked by the first dispatch function. In an embodiment, if there is a lull in the network traffic processed by the message processing service, the number of messages in the message queue will be fewer than the number of messages initially processed by the message consumption functions invoked by the first dispatch worker. Alternatively, in an embodiment, if there is an increase in the network traffic processed by the message processing service, the number of messages in the message queue will be greater than the number of messages initially processed by the message consumption functions invoked by the first dispatch worker.

In an embodiment, the next dispatch function identifies the number of messages now present in the message queue and the new value for μ determined by the message processing service or the triggering system to calculate the number of new message consumption functions that are to be invoked. In an embodiment, based at least in part on the value of μ and the number of messages in the message queue, the number of new message consumption functions can be less than or greater than the number of message consumption functions invoked by the first dispatch function. In an embodiment, each new message consumption function invoked by the next dispatch function has the same message consumption function duration 308 as the previously invoked message consumption functions. Thus, in an embodiment, there is an overlap between message consumption functions invoked by the first dispatch function and the next dispatch function. In an embodiment, the message consumption function duration for the new set of message consumption functions differs from the message consumption function duration 308 for the first set of message consumption functions. This can occur in the event that the message processing service changes the value of the overlap factor due to changes in the network, including highly erratic variations in network traffic, increases in the cost of implementing the set of dispatch functions and/or message consumption functions, and the like. In an embodiment, the message consumption function duration between sets of message consumption functions can differ in the event of reduced network traffic, which can result in a reduction in the message consumption function duration for message consumption functions invoked during this lull in network traffic.

In an embodiment, the overlapping message consumption function durations for differing sets of message consumption functions enables a message consumption function invoked during the message consumption function duration of a previously invoked function to process any new messages added to the message queue after the previously invoked function was initially invoked. Additionally, in an embodiment, if after invocation of a set of message consumption functions the network traffic increases dramatically, resulting in a sharp increase in the number of messages added to the message queue, the triggering system can invoke another dispatch function within the message consumption function duration 308 of previously invoked message consumption functions in accordance with the overlap factor. This causes the new dispatch function to identify the increased number of messages in the message queue and invoke a new set of message consumption functions that can process these messages. This enables the message processing service to respond to changes in network traffic through use of the dispatch functions and the message consumption functions through overlapping time intervals.

In an embodiment, the message processing service responds to changes in network traffic by either increasing or decreasing the number of message consumption functions that are invoked by the dispatch functions after every X/Ø interval of time. In an embodiment, if there is a drastic increase in network traffic, the dispatch function, which is invoked after an X/Ø interval of time after the invocation of a previous dispatch function, invokes additional message consumption functions in accordance with the equations described herein to address this increase in network traffic (e.g., number of messages added to the message queue). In an embodiment, the overlap factor is modified by the message processing service based at least in part on historical data regarding the processing of messages from the queue and variations in network traffic over time.

Figure 4:
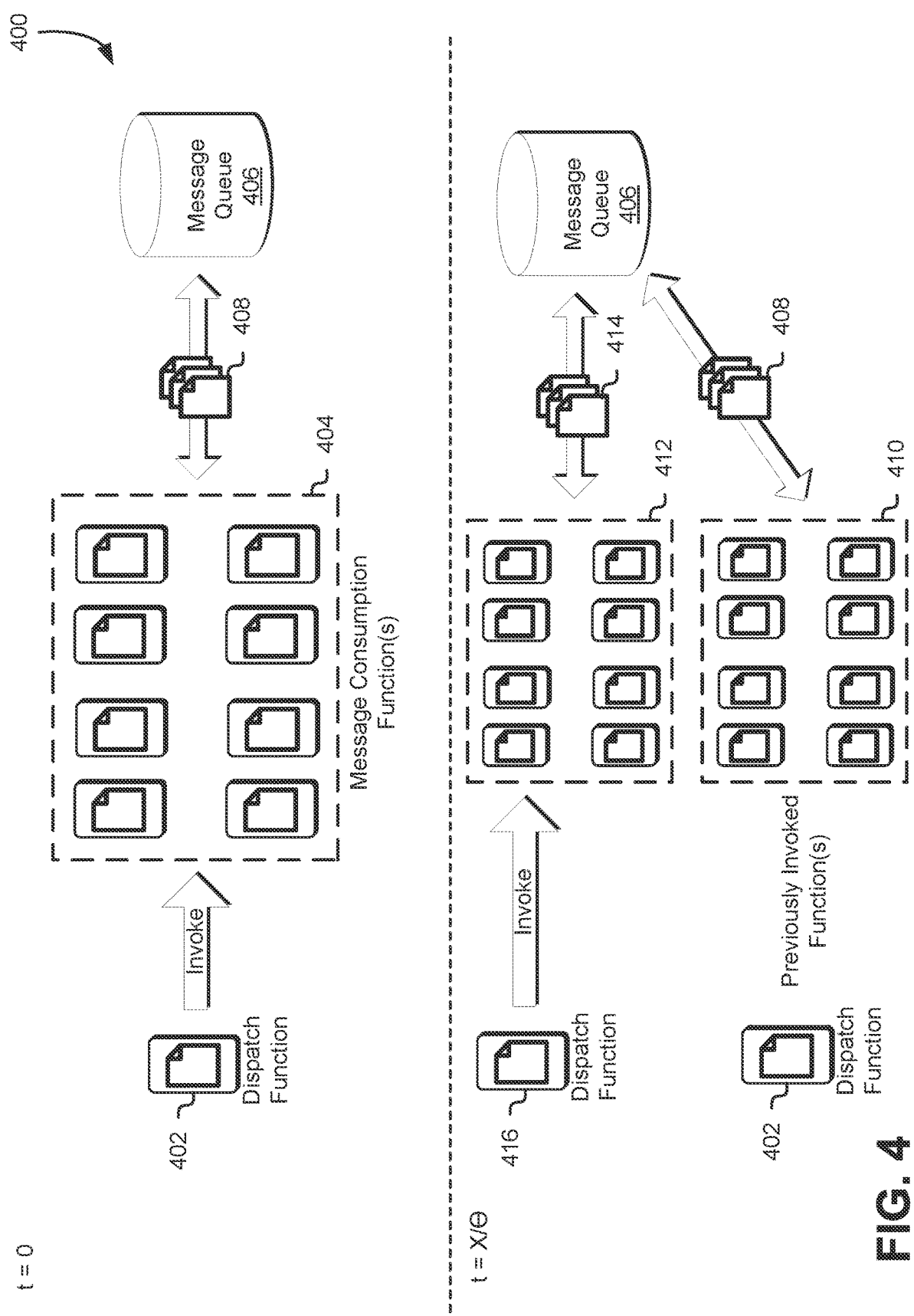
FIG. 4 shows an illustrative example of a system in which a dispatch function invokes an additional set of message consumption functions for the processing of additional messages from a message queue to overlap with a first set of message consumption functions in accordance with at least one embodiment.

FIG. 4 shows an illustrative example of a system 400 in which a dispatch function 416 invokes an additional set of message consumption functions 412 for the processing of additional messages 414 from a message queue 406 to overlap with a first set of message consumption functions 410 in accordance with at least one embodiment. In the system 400, at an initial time (e.g., t=0), a triggering system invokes a dispatch function 402 that determines a set of message consumption functions 404 that can be invoked to process a set of messages 408 from a message queue 406. In an embodiment, the dispatch function 402 invokes a message consumption function to determine the time required by the message consumption function to process a message from the message queue 406. In an embodiment, the time required by a message consumption function to process a message is a constant value maintained by the message processing service and is provided to the dispatch function 402 upon invocation, obviating a need to obtain experimental data through invocation of a message consumption function.

In an embodiment, the dispatch function 402 queries the message queue 406 to identify the batch size of the messages 408 that can be processed by a message consumption function. In an embodiment, the dispatch function 402 uses the batch size of the messages 408 that can be processed by a message consumption function and the time required by a message consumption function to process a single message to determine a period of time during which the message consumption functions 404 cannot obtain and process additional messages from the message queue 406. In an embodiment, this period of time is calculated according to Eq. 1. In an embodiment, the dispatch function 402 uses the timespan duration of a message consumption function, the period of time calculated according to Eq. 1, and the time required by a message consumption function to process a single message to determine the number of messages 408 that can be processed by a message consumption function. This number of messages 408 that can be processed by a message consumption function, in an embodiment, is calculated by the dispatch function 402 in accordance with Eq. 2.

In an embodiment, the dispatch function 402 queries the message queue 406 to identify the number of messages 408 that are to be processed by the message consumption functions 404 that are to be invoked. In an embodiment, the dispatch function 402 uses the number of messages 408 in the message queue 406, as well as the number of messages that can be processed by a message consumption function during its timespan duration, to calculate the number of message consumption functions 404 that are to be invoked in order to process the messages 408 from the message queue 406. In an embodiment, the dispatch function 402 incorporates an additional factor, $\alpha$, that is used to increase the number of message consumption functions 404 that are to be invoked to process the messages 408 from the message queue 406. This factor, $\alpha$, in an embodiment, is a value between 0 and 1 and denotes a safety factor usable to enable the processing of additional messages that are added to the message queue 406 after the message consumption functions 404 are invoked and before the next invocation of a dispatch function 416. Using the safety factor, $\alpha$, the dispatch function 402 calculates the number of message consumption functions 404 that are to be invoked according to Eq. 4, described above. If no safety factor is used, the dispatch function 402 can calculate the number of message consumption functions 404 in accordance with Eq. 3.

In an embodiment, the invocation of dispatch functions are subject to an overlap factor, which is used to determine a time during the timespan duration of an invoked dispatch function at which another dispatch function can be invoked. The invocation of a dispatch function during the timespan duration of an invoked dispatch function creates an overlap. This overlap factor, in an embodiment, is determined based at least in part on the variability of network traffic. In an embodiment, the overlap factor is set to a higher value if network traffic is erratic (e.g., network traffic experiences significant peaks and lulls at irregular intervals, network traffic is unpredictable, etc.). In an embodiment, the overlap factor is set to a higher value if it is difficult or time-intensive to invoke a dispatch function. In an embodiment, the overlap factor is set to a higher value if the cost incurred in invoking the dispatch function and the message consumption functions is high or is expected to increase over time.

In an embodiment, the triggering system utilizes the overlap factor, Ø, and the timespan duration of a dispatch function to calculate the time at which the next dispatch function 416 is to be invoked. In an embodiment, the time is calculated in accordance with Eq. 5. In an embodiment, if the invocation of dispatch functions is subject to an overlap factor, the dispatch function 402 calculates the number of message consumption functions 404 to be invoked using an additional scaling factor, $\mu$. In an embodiment, the dispatch function 402 calculates the number of message consumption functions 404 that are to be invoked in accordance with Eq. 6. In an embodiment, the value for $\mu$ is set by the message processing service, which can select the value of $\mu$ based at least in part on the historical efficiency of the message consumption functions in processing messages from the message queue 406 and the variability in network traffic.

In an embodiment, at a time of X/Ø, where X is the timespan duration of the dispatch function 402 and Ø is the overlap factor, the triggering system invokes another dispatch function 416. The dispatch function 416 queries the message queue 406 to identify the number of messages 414 that are to be processed by the message consumption functions 412 that are to be invoked. These messages 414, in an embodiment, are added to the message queue 406 at a time after the previously invoked message consumption functions 410 were invoked by the dispatch function 402. In an embodiment, the timespan duration of the dispatch function 416 is the same as the timespan duration of the dispatch function 402. In an embodiment, if the amount of network traffic is reduced (e.g., there is a lull in network traffic), the timespan duration of the dispatch function 416 and the message consumption functions 412 is reduced, as the number of messages 414 present in the message queue 406 are reduced as well. In an embodiment, the timespan duration of the message consumption functions 412 are reduced in response to detection of the message consumption functions 412 terminating prior to their configured timespan duration. This occurs as a result of a reduced number of messages being present in the message queue that are to be processed.

In an embodiment, the message processing service implements a new value for the overlap factor, Ø, and for the scaling factor, µ, based at least in part on the detected network traffic over time. In an embodiment, the message processing service evaluates data logs associated with the processing of messages from the message queue and network traffic over time to identify an overlap factor usable to invoke message consumption functions that can process messages according to demand. In an embodiment, if the network traffic has become highly erratic, resulting in significant variations during the timespan duration of the dispatch function 402, the message processing service will increase the value of the overlap factor. In an embodiment, if the expense in invoking dispatch functions and message consumption functions has increased, the message processing service can increase the value for the overlap factor. Thus, based at least in part on the new values for the overlap factor and the scaling factor, the triggering system determines a time at which the next dispatch function after invocation of the dispatch function 416 is to be invoked. In an embodiment, the newly invoked dispatch function 416 uses the scaling factor, µ, as well as the new timespan duration of message consumption functions determined based at least in part on the network traffic detected by the message processing service, to determine the number of message consumption functions 412 that are to be invoked to process messages 414 from the message queue 406. In an embodiment, the dispatch function 416 determines this number of message consumption functions 412 in accordance with Eq. 6.

In an embodiment, if the message processing service does not implement an overlap factor (e.g., there is to be no overlap among dispatch functions and message consumption functions), the dispatch function 416 is invoked at the end of the timespan duration of the dispatch function 402. The dispatch function 416, in an embodiment, invokes a number of message consumption functions 412 calculated in accordance with Eqs. 3 or 4, dependent on whether the message processing service implements a safety factor, α. In an embodiment, if the message processing service implements a safety factor for the invocation of message consumption functions 412, the dispatch function 416 utilizes the safety factor as described above in connection with Eq. 4 to invoke a greater number of message consumption functions 412 than required to process the messages 414 from the message queue 406. In an embodiment, if an overlap factor is not used, the message consumption functions 412 are invoked at the end of the timespan duration of the previously invoked functions 410, resulting in no overlap among these message consumption functions.

Figure 5:
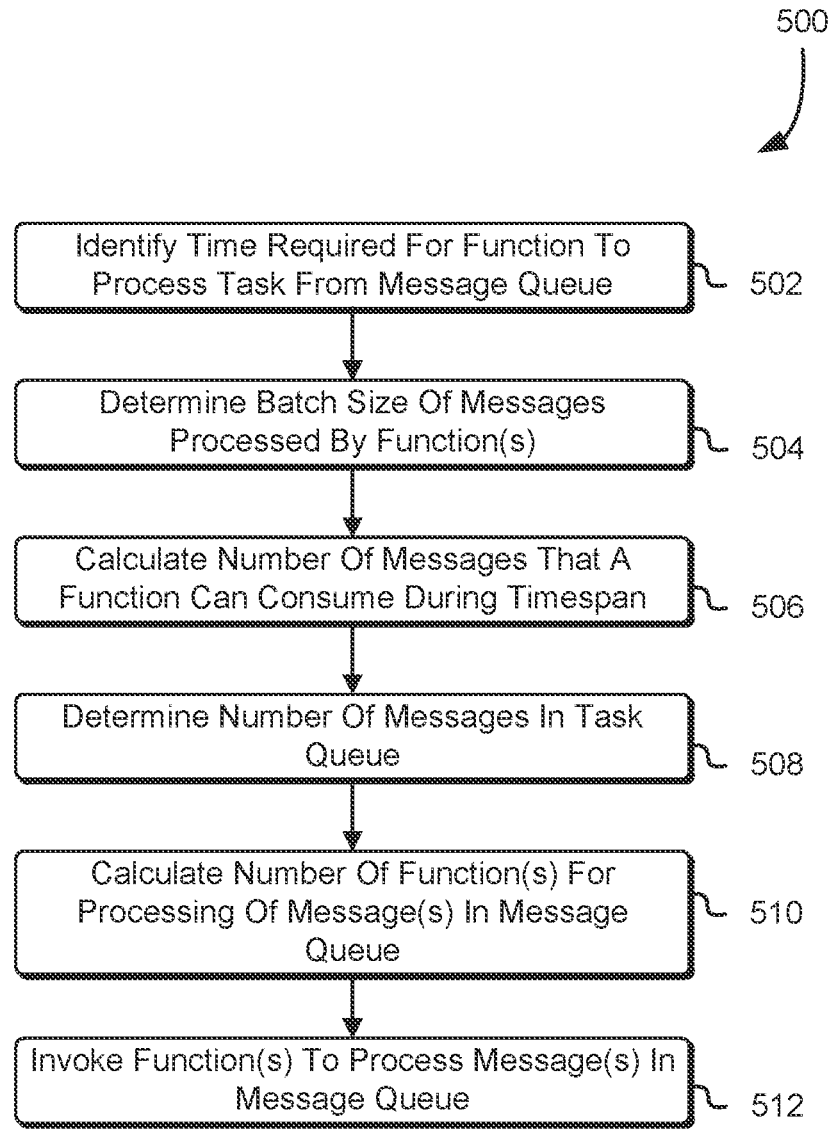
FIG. 5 shows an illustrative example of a process for determining a number of message consumption functions to be invoked for the processing of messages in a message queue in accordance with at least one embodiment.

FIG. 5 shows an illustrative example of a process 500 for determining a number of message consumption functions to be invoked for the processing of messages in a message queue in accordance with at least one embodiment. The process 500 is performed by a computer system, an application installed on a computer system, or a module of an application, such as a dispatch function, which invokes message consumption functions for the processing of messages from a message queue maintained by a message processing service. In an embodiment, a triggering system of the message processing service invokes a dispatch function usable to determine the number of message consumption functions that are to process messages from a message queue and to invoke this number of message consumption functions.

In an embodiment, the dispatch function identifies 502 the amount of time that it takes for a message consumption function to process a message from the message queue. In an embodiment, to determine the amount of time needed for a message consumption function to process a message from the message queue, the dispatch function invokes a message consumption function and monitors this message consumption function as it processes messages from the message queue. Through the monitoring of the message consumption function, the dispatch function identifies the amount of time that it takes for a message consumption function to process a message. In an embodiment, this amount of time is provided to the dispatch function by the triggering system as part of the executable code that is executed by the dispatch function. In an embodiment, the dispatch function identifies this amount of time from a reference datastore maintained by the message processing service.

In an embodiment, the dispatch function queries the message queue to determine 504 the batch size of the messages that can be obtained by a message consumption function for processing. In an embodiment, the dispatch function queries the message queue to identify the number of messages that are present in the message queue prior to the message consumption function obtaining messages for processing. After the message consumption function has been invoked, the dispatch function queries the message queue to determine the number of messages that have been obtained by the message consumption function for processing. This value is used by the dispatch function as the batch size of the messages that are processed by a message consumption function. In an embodiment, rather than querying the message queue to determine the batch size of messages processed by a message consumption function, the dispatch function obtains this information from the triggering system via the executable code that is executed by the dispatch function. In an embodiment, the dispatch function identifies this batch size from the reference datastore maintained by the message processing service.

In an embodiment, the dispatch function uses the time required by the message consumption function to process a message and the batch size of messages obtained by the message consumption function for processing to calculate a time period during which the message consumption function is not to process messages or obtain additional messages from the message queue. In an embodiment, this calculation is performed in accordance with Eq. 1, described above. In an embodiment, the dispatch function identifies, from the triggering system or from the reference datastore, the timespan duration of a message consumption function. Using this information, as well as the amount of time required by a message consumption function to process a message and the time period during which a message consumption function is to not obtain or process additional messages, the dispatch function calculates 506 the number of messages that a message consumption function can process or consume during its timespan duration. In an embodiment, this calculation is performed in accordance with Eq. 2.

In an embodiment, the dispatch function queries the message queue to determine 508 the number of messages that are available in the message queue for processing. In an embodiment, based at least in part on the number of messages that are present in the message queue for processing, the dispatch function calculates 510 the number of message consumption functions to be invoked for the processing of these messages from the message queue. In an embodiment, this number of message consumption functions is calculated in accordance with Eq. 3, whereby the number of messages from the message queue is divided by the number of messages that can be consumed by a message consumption function during its timespan duration. In an embodiment, the message processing service utilizes a safety factor, $\alpha$, that is usable to cause invocation of additional message consumption functions for the processing of messages. This safety factor is used by the message processing service to enable for the processing of additional messages that are added to the message queue after the message consumption functions are invoked and prior to the invocation of another dispatch function by the triggering system. If a safety factor is implemented, the dispatch function calculates the number of message consumption functions that are to be invoked using this safety factor. In an embodiment, this calculation is performed in accordance with Eq. 4, described above.

In an embodiment, the message processing service implements an overlap factor, $\emptyset$, to enable invocation of additional message consumption functions during the timespan duration of previously invoked message consumption functions for the processing of messages added to the message queue. In an embodiment, if there is a significant increase in the amount of network traffic in the network, resulting in a significant increase in the number of messages added to the message queue, the overlap factor enables message consumption functions to be invoked to process these additional messages. In an embodiment, if the message processing service implements an overlap factor, the triggering system calculates, based at least in part on this overlap factor, a scaling factor, $\mu$, that can be used to determine the number of message consumption functions that are to be invoked by the dispatch function. In an embodiment, if the scaling factor is implemented, the dispatch function calculates the number of message consumption functions in accordance with Eq. 6, described above. Thus, similar to the impact caused through use of the safety factor, $\alpha$, described above, implementation of the scaling factor, $\mu$, also results in a greater number of message consumption functions being invoked.

In an embodiment, based at least in part on the calculation of the number of message consumption functions for the processing of messages from the message queue, the dispatch function invokes 512 the calculated number of message consumption functions for the processing of messages from the message queue. Each message consumption function accesses the message queue to obtain a set of messages and begins processing these messages, generating message results. These results are stored in a repository of the message processing service, which can provide these results to customers of a service provider or other services that can use these results for various purposes.

Figure 6:
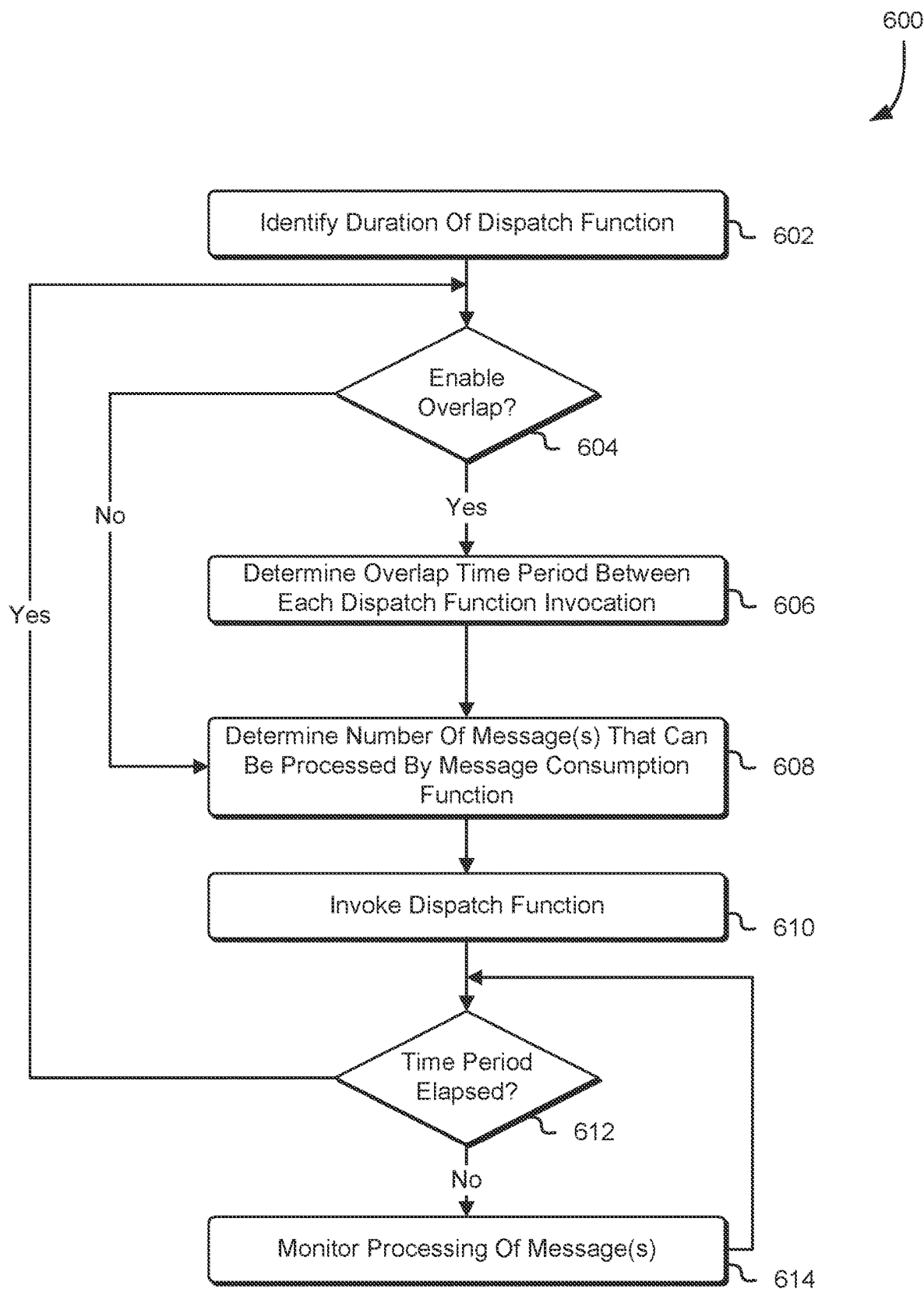
FIG. 6 shows an illustrative example of a process for invoking dispatch functions for the invocation of message consumption functions in overlapping time periods in accordance with at least one embodiment.

FIG. 6 shows an illustrative example of a process 600 for invoking dispatch functions for the invocation of message consumption functions in overlapping time periods in accordance with at least one embodiment. The process 600 is performed by a computer system, such as the triggering system or another computer system of the message processing service, an application installed on a computer system, or a module of an application which processes information regarding the duration of dispatch functions and whether there is to be an overlap between dispatch functions to determine a time period between each dispatch function invocation.

In an embodiment, the triggering system identifies 602 the timespan duration of a dispatch function. In an embodiment, the triggering system obtains this information from a repository of the message processing service, which can include specifications for the dispatch function (e.g., processing times, timespan durations, hardware and software specifications, etc.). In an embodiment, the triggering system transmits a request to a container service to request information regarding software containers of the type used to implement the dispatch function.

In an embodiment, the triggering system determines 604 whether an overlap factor is to be applied in the determination of a time period between each dispatch function invocation. In an embodiment, the message processing service provides the triggering system with an overlap factor that is to be applied in order to determine the time period between each dispatch function invocation. This overlap factor, in an embodiment, is determined based at least in part on the variability of network traffic. In an embodiment, the overlap factor is provided as part of the configuration of the triggering system on the basis of historical data regarding network traffic observed by the message processing service. In an embodiment, the overlap factor is set to a higher value if network traffic is erratic (e.g., network traffic experiences significant peaks and lulls at irregular intervals, network traffic is unpredictable, etc.). In an embodiment, if network traffic varies significantly within the timespan duration of a dispatch function or message consumption function, a higher overlap factor is used to reduce the amount of time between dispatch function invocations. In an embodiment, the overlap factor is set to a higher value if it is difficult or time-intensive to invoke a dispatch function. In an embodiment, the overlap factor is set to a higher value if the cost incurred in invoking the dispatch function and the message consumption functions is high or is expected to increase over time.

In an embodiment, if the triggering system determines that an overlap factor is to be applied, the triggering system determines 606 an overlap time period between each dispatch function invocation. In an embodiment, the triggering system utilizes the identified timespan duration of a dispatch function and the overlap factor to calculate the time period between each dispatch function invocation. In an embodiment, this calculation is performed in accordance with Eq. 5. Thus, as the overlap factor increases, the amount of time between each dispatch function invocation decreases, resulting in a greater overlap between dispatch functions.

In an embodiment, if an overlap factor is not applied or the triggering system has determined the overlap time period between each dispatch function invocation, the triggering system determines 608 the number of messages that can be processed by a message consumption function. In an embodiment, the triggering system invokes a message consumption function to process a set of messages from the message queue for experimental purposes. The triggering system monitors the message consumption function to determine a time required by the message consumption function to process a single message from the message queue. Further, in an embodiment, the triggering system queries the message queue to determine the batch size of the messages obtained by the message consumption function for processing. Using this information, the triggering system calculates the time period during which the message consumption function is not permitted to obtain or process additional messages from the message queue. In an embodiment, this calculation is performed in accordance with Eq. 1. In an embodiment, the triggering system uses the result of this calculation, as well as the timespan duration of the message consumption function and the amount of time required by the message consumption function to process a message from the message queue, to calculate the number of messages that can be processed by a message consumption function. In an embodiment, this calculation is performed in accordance with Eq. 2, described above.

In an embodiment, the triggering system invokes 610 a dispatch function that is configured to invoke a number of message consumption functions for the processing of messages from the message queue. In an embodiment, the triggering system provides information specifying the number of messages that can be processed by a message consumption function to the dispatch function. In an embodiment, if an overlap factor was applied to determine the overlap time period between each dispatch function invocation, the triggering system, the triggering system determines a scaling factor, $\mu$, that can be applied by the dispatch function to determine the number of message consumption functions that are to be invoked for processing of messages from the message queue. In an embodiment, the dispatch function uses the scaling factor in accordance with Eq. 6 to calculate the number of message consumption functions that are to be invoked. In an embodiment, if an overlap factor was not applied (e.g., there is no overlap time period between each dispatch function invocation), the dispatch function calculates the number of message consumption functions for the processing of messages from the message queue in accordance with Eq. 3. In an embodiment, the triggering system provides the dispatch function with a safety factor, $\alpha$, that can be instituted to enable message consumption functions to process additional messages added to the message queue after invocation of the message consumption functions but prior to invocation of another dispatch function. The dispatch function, in an embodiment, uses the safety factor in accordance with Eq. 4 to calculate the number of message consumption functions that are to be invoked for processing of the messages in the message queue.

In an embodiment, the triggering system monitors the dispatch function and determines 612 whether the time period between each dispatch function invocation has elapsed. In an embodiment, if an overlap factor is not applied, this time period coincides with the end of the timespan duration of the dispatch function. This enables the triggering system to invoke the dispatch function periodically, where the period of time is based at least in part on the timespan duration of the previously invoked dispatch function. In an embodiment, if an overlap factor has been applied, the time period between each dispatch function invocation is defined by Eq. 5 as being the timespan duration of a dispatch function divided by the overlap factor. In an embodiment, if the time period between each dispatch function invocation has not elapsed, the triggering system continues to monitor 614 the dispatch function and the message consumption functions invoked by the dispatch function as these message consumption functions process messages from the message queue. However, if the triggering system determines that the time period between each dispatch function invocation has elapsed, the triggering system determines 604 whether an overlap factor is to be applied for determination of an overlap time period between each dispatch function invocation. In an embodiment, the triggering system determines that an overlap factor is to be applied after the invocation of a dispatch function. Thus, this new overlap factor can result in a determination 606 of a new overlap time period between each dispatch function. In an embodiment, the triggering system determines that an update of the existing overlap factor is to be implemented, which results in a new determination of an overlap time period between each dispatch function invocation. In an embodiment, if the triggering system determines that an overlap factor is no longer required, the triggering system foregoes the determination of the overlap time period between each dispatch function invocation and invokes 610 a new dispatch function. This new dispatch function is provided with information usable to determine the number of message consumption functions that are to be invoked to process the messages in the message queue. Thus, invocation of the dispatch functions is performed repeatedly (e.g., periodically) to enable the invocation of message consumption functions for the processing of messages from the message queue as these messages are added to the message queue.

Figure 7:
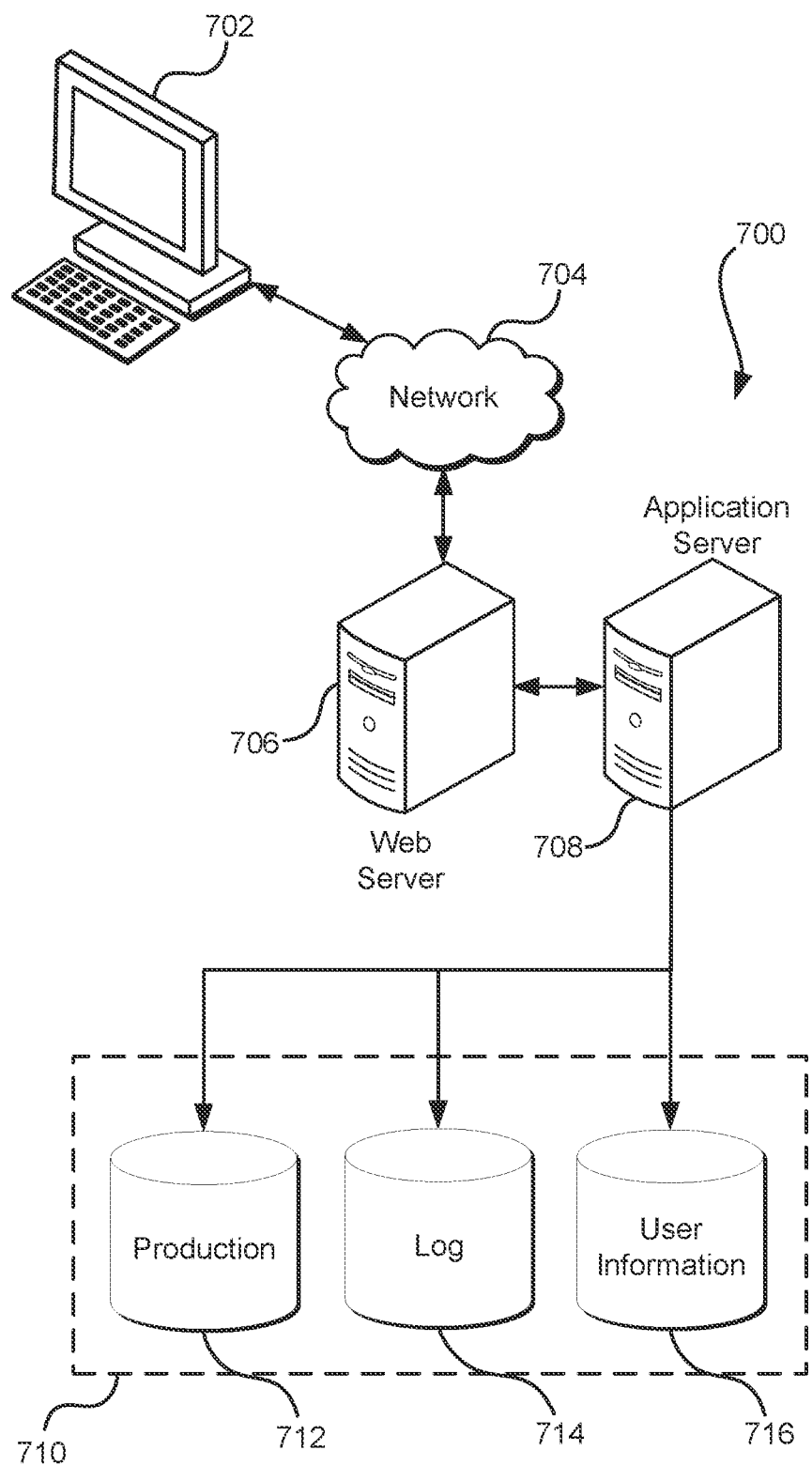
FIG. 7 shows an illustrative example of a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving messages into a queue; and
   processing the messages in the queue by at least launching code of a first function to:
   determine a number of messages in the queue;
   determine a number of instances of a second function to execute to process the messages in the queue based on the number of messages in the queue; and
   launch the determined number of instances of the second function to cause the messages in the queue to be processed.

2. The computer-implemented method of claim 1, wherein determination of the number of instances of the second function is further based on a time of the second function to process a message in the queue.

3. The computer-implemented method of claim 1, wherein the method further comprises:
receiving second messages into the queue, the second messages received during a timespan of the instances of the second function; and
processing the second messages in the queue by at least launching code of the first function to:
determine a number of second messages in the queue;
determine a second number of instances of the second function to execute the second messages in the queue based on the number of second messages in the queue; and
launch the determined second number of instances of the second function during the timespan of the instances of the second function to cause the second messages in the queue to be processed.

4. The computer-implemented method of claim 1, wherein the instances of the second function are launched in software containers.

5. A system, comprising:
one or more processors;
memory that stores computer-executable instructions that, if executed, cause the one or more processors to:
execute code of a first function to determine, based at least in part on a number of items in a set of items to be processed, a number of instances of a second function to launch to process the set of items; and
launch the the determined number of instances of the second function to process the set of items according to results of execution of the first function.

6. The system of claim 5, wherein the computer-executable instructions further cause the one or more processors to:
determine an overlap factor usable to identify a time period between executions of the code of the first function;
utilize the overlap factor to identify the time period;
after execution of the code of the first function, determine whether the time period between the executions has elapsed; and
as a result of the time period having elapsed, execute the code of the first function to determine, based at least in part on a second number of items in a second set of items to be processed, a second number of instances of the second function to launch to process the second set of items.

7. The system of claim 5, wherein the the number of instances of the second function are further determined based at least in part on a factor defined based at least in part on a second set of items that can be processed after the the determined number of instances of the second function are launched.

8. The system of claim 5, wherein the code of the first function is executed repeatedly to determine the the number of instances of the second function.

9. The system of claim 5, wherein the set of items to be processed comprises a set of items present in a queue.

10. The system of claim 5, wherein the set of items comprise one or more messages performable by the the determined number of instances of the second function.

11. The system of claim 5, wherein the computer-executable instructions further cause the one or more processors to:
detect that execution of the first function has completed; and
execute the code of the first function to determine a second number of instances of the second function to launch to process a second set of items.

12. The system of claim 5, wherein the the number of instances of the second function are further determined based at least in part on a time period during which instances of the second function are to process items without obtaining additional items for processing.

13. A non-transitory computer-readable storage medium having stored thereon executable instructions that, as a result of being executed by one or more processors of a computer system, cause the computer system to at least:
execute code of a first function to determine, based at least in part on a number of messages in a set of messages to be processed from a queue, a number of instances of a second function to launch to process the set of messages; and
launch the the determined number of instances of the second function to process the set of messages according to results of execution of the first function.

14. The non-transitory computer-readable storage medium of claim 13, wherein the code of the first function is executed periodically to determine the number of instances of the second function.

15. The non-transitory computer-readable storage medium of claim 13, wherein the executable instructions further cause the computer system to:
detect that execution of the first function has completed; and
as a result of the execution of the first function has completed, execute the code of the first function to determine, based at least in part on a second number of messages in a second set of messages to be processed from the queue, a second number of instances of the second function to launch to process the second set of messages.

16. The non-transitory computer-readable storage medium of claim 13, wherein:
the code of the first function, as a result of being executed, determines a time period during which instances of the second function are to process messages without obtaining additional messages for processing; and
the number of instances of the second function are further determined based at least in part on the time period.

17. The non-transitory computer-readable storage medium of claim 13, wherein the executable instructions further cause the computer system to:
determine a factor usable to identify a time period between executions of the code of the first function;
identify, based at least in part on the factor, the time period;
after execution of the code of the first function, determine whether the time period between the executions has elapsed; and
as a result of the time period having elapsed, execute the code of the first function to determine, based at least in part on a second number of messages in a second set of messages to be processed from the queue, a second number of instances of the second function to launch to process the second set of messages.

18. The non-transitory computer-readable storage medium of claim 13, wherein the number of instances of the second function are further determined based at least in part on a factor defined based at least in part on a second set of messages that can be processed after the determined number of instances of the second function are launched.

19. The non-transitory computer-readable storage medium of claim 13, wherein the code of the first function is executed using a software container.

20. The non-transitory computer-readable storage medium of claim 13, wherein launching the determined number of instances of the second function includes invoking a set of software containers that include a second code that, as a result of execution of the second code, processes the set of messages.

\* \* \* \* \*